(12) United States Patent
Tsumiyama

(10) Patent No.: US 6,706,346 B2
(45) Date of Patent: Mar. 16, 2004

(54) PROCESS FOR PRODUCTION OF METAL ENCASED POLYIMIDE MOLDED BODIES AND METAL ENCASED POLYIMIDE MOLDED BODIES

(75) Inventor: Tatsuo Tsumiyama, Ube (JP)

(73) Assignee: Ube Industries, Ltd., Yamaguchi-ken (JP)

(*) Notice: Subject to any disclaimer, the term of this patent is extended or adjusted under 35 U.S.C. 154(b) by 407 days.

(21) Appl. No.: 09/909,834

(22) Filed: Jul. 23, 2001

(65) Prior Publication Data

US 2002/0030299 A1 Mar. 14, 2002

(30) Foreign Application Priority Data

Jul. 24, 2000 (JP) .................................. 2000-221996

(51) Int. Cl.⁷ ............................................. B29D 31/00
(52) U.S. Cl. ................. 428/35.8; 428/408; 156/308.2; 29/469.5; 29/505
(58) Field of Search ................... 264/101, 109–128, 264/259, 266, 279.7; 428/35.7, 35.8, 408; 156/308.2; 29/469.5, 505

(56) References Cited

U.S. PATENT DOCUMENTS 5,898,048 A * 4/1999 Yamaguchi et al. ........ 528/353

FOREIGN PATENT DOCUMENTS

| JP | 57 200452 | 12/1982 |
| JP | 57 200453 | 12/1982 |
| JP | 64 87307 | 3/1989 |
| JP | 01 266134 | 10/1989 |

* cited by examiner

*Primary Examiner*—Stephen J. Lechert, Jr.
(74) *Attorney, Agent, or Firm*—Morgan, Lewis & Bockius LLP

(57) ABSTRACT

A process for production of polyimide molded bodies which comprises a step in which a polyimide resin powder obtained by polymerization and imidation of p-phenylenediamine with 3,3,4,4'-biphenyltetracarboxylic acid, its ester or its dianhydride and 2,3,3',4'-biphenyltetracarboxylic acid, its ester or its dianhydride is molded at a pressure of approximately 800–5,000 $kgf/cm^2$, a step in which the pressurized body is subjected to calcination at about 450–550° C. under low pressure, a step in which the calcined molded body is vacuum encapsulated into a metal capsule, and a step in which the encapsulated molded body is isotropically subjected to hot compression at approximately 460–550° C. in an inert gas atmosphere such as argon. The polyimide molded bodies obtained thereby have a density in the range of 1.44–1.38 $g/cm^3$.

8 Claims, 1 Drawing Sheet

PROCESS FOR PRODUCTION OF METAL ENCASED POLYIMIDE MOLDED BODIES AND METAL ENCASED POLYIMIDE MOLDED BODIES

BACKGROUND OF THE INVENTION

1. Field of the Invention

The present invention relates to a process for production of biphenyl tetracarboxylic acid-based polyimide molded bodies with satisfactory molded body properties and productivity, and to the polyimide molded bodies produced thereby.

The invention is characterized by excellent productivity by allowing molding of a plurality of bodies at one time, by giving polyimide powder molded bodies with density that is close to the true density of the polyimide resin powder starting material, and by giving molded bodies with high toughness and mechanical strength and substantially no anisotropy of the linear expansion coefficient.

2. Description of the Related Art

Pyromellitic acid-based polyimide powder molded bodies obtained from a pyromellitic acid component and 4,4'-diaminodiphenylene ether have been widely used in the prior art as polyimide powder molded bodies because of their high toughness and satisfactory cutting workability.

However, pyromellitic acid-based polyimide molded bodies have high moisture absorption, considerable out gas and low chemical resistance and dimensional stability.

3,3',4,4'-biphenyltetracarboxylic acid-based polyimide powder molded bodies have therefore been proposed.

Examples of such 3,3',4,4'-biphenyltetracarboxylic acid-based polyimide powder molded bodies are described, for example, in Japanese Unexamined Patent Publication No. 57-200452 (Japanese Examined Patent Publication No. 2-48571) and Japanese Unexamined Patent Publication No. 57-200453, wherein there are obtained heated/compressed molded bodies of aromatic polyimide powder with an imidation rate of 95% or greater obtained by polymerization and imidation of a 3,3',4,4'-biphenyltetracarboxylic acid component and an aromatic diamine component in N-methyl-2-pyrrolidone.

Also, polyimide powder molded bodies containing inorganic powder such as fine particulate graphite are described in Japanese Unexamined Patent Publication No. 63-81160.

According to these publications, these polyimide powder molded bodies exhibit excellent mechanical strength.

However, high-strength polyimide powder molded bodies with high heat resistance have been shown to have certain drawbacks, possibly due to their low elongation, such as breakage during molding and poor suitability for molding into complex shapes, when the molded bodies are subjected to secondary working into various shapes by cutting or the like; in other words, their toughness and cutting workability are low.

For this reason, it has been attempted to improve the powder fusing properties during hot compression molding in order to increase the elongation and mechanical strength of the molded bodies.

For example, a method of compression molding of polyimide powder obtained by mixing a thermoplastic polyimide with a polyimide obtained from a 3,3',4,4'-biphenyltetracarboxylic acid component and an aromatic diamine component has been attempted, but this has been associated with problems such as difficulty in obtaining a uniform mixture of the two components with completely different properties, the fact that the mechanical strength and elongation of the resulting molded bodies have still not reached a satisfactory level, and the fact that the heat resistance is instead reduced.

It has also been attempted to first extract polyamic acid powder (aggregates) and subject it to heating, drying and pulverization to obtain polyimide powder, and then subject this to compression molding to obtain a molded body. However, it has been found difficult to control the heating temperature in order to prevent production of powder aggregates when the polyamic acid powder is heated for imidation, while metal impurities also tend to be included in the polyamic acid powder, so that the process is not practical.

There have hence been proposed processes for high-temperature, high-pressure hot compression molding of polyimide resin powders obtained by polymerization and imidation of p-phenylenediamine with 3,3,4,4'-biphenyltetracarboxylic acid, its ester or its dianhydride and 2,3,3',4'-biphenyltetracarboxylic acid, its ester or its dianhydride, for example, a process for production of polyimide molded bodies involving simultaneous heated firing and pressure/compression with a uniaxial press at a molding temperature of 450° C. and a molding pressure of 3,000 kgf/cm$^2$.

The polyimide molded bodies obtained by these molded body production processes exhibit high strength, but the molded bodies show linear expansion coefficient anisotropy and also have low productivity, such that problems arise in terms of cost for mass production.

BRIEF SUMMARY OF THE INVENTION

It is therefore an object of the present invention to provide a process for production of polyimide molded bodies that exhibit improvement in the properties of high moisture absorption, considerable out gas and low chemical resistance and dimensional stability exhibited by pyromellitic acid-based polyimide powder molded bodies comprising a pyromellitic acid component and 4,4'-diaminodiphenyl ether, while also exhibiting high mechanical strength and high productivity, as well as the polyimide molded bodies obtained by the process.

In other words, the invention provides a process for production of polyimide molded bodies which comprises a step in which a polyimide resin powder obtained by polymerization and imidation of p-phenylenediamine with 3,3,4,4'-biphenyltetracarboxylic acid, its ester or its dianhydride and 2,3,3',4'-biphenyltetracarboxylic acid, its ester or its dianhydride is molded at a pressure of approximately 800–5,000 kgf/cm$^2$, a step in which the pressurized body is subjected to calcination at about 450–550° C. under low pressure and preferably in the absence of pressure, a step in which the calcined molded body is vacuum encapsulated into a metal capsule, and a step in which the encapsulated molded body is isotropically subjected to hot compression at approximately 460–550° C. in an inert atmosphere and preferably in an argon atmosphere.

The invention further provides a polyimide molded body produced by the aforementioned process wherein the density of the molded body is in the range of 1.44–1.48 g/cm$^3$.

The invention still further provides a polyimide molded body which is obtained by molding polyimide powder containing at least 70 mole percent of a 3,3',4,4'-biphenyltetracarboxylic dianhydride component and at least 70 mole percent of a phenylenediamine component, by a molding method involving the HIP method, and which has a flexural strength of approximately 85 MPa or greater.

The invention still further provides a process for production of polyimide molded bodies which comprises molding polyimide powder containing at least 70 mole percent of a 3,3',4,4'-biphenyltetracarboxylic dianhydride component and at least 70 mole percent of a phenylenediamine component, by a molding method involving the HIP method, wherein the resulting molded bodies have a flexural strength of approximately 85 MPa or greater.

Figure 1:
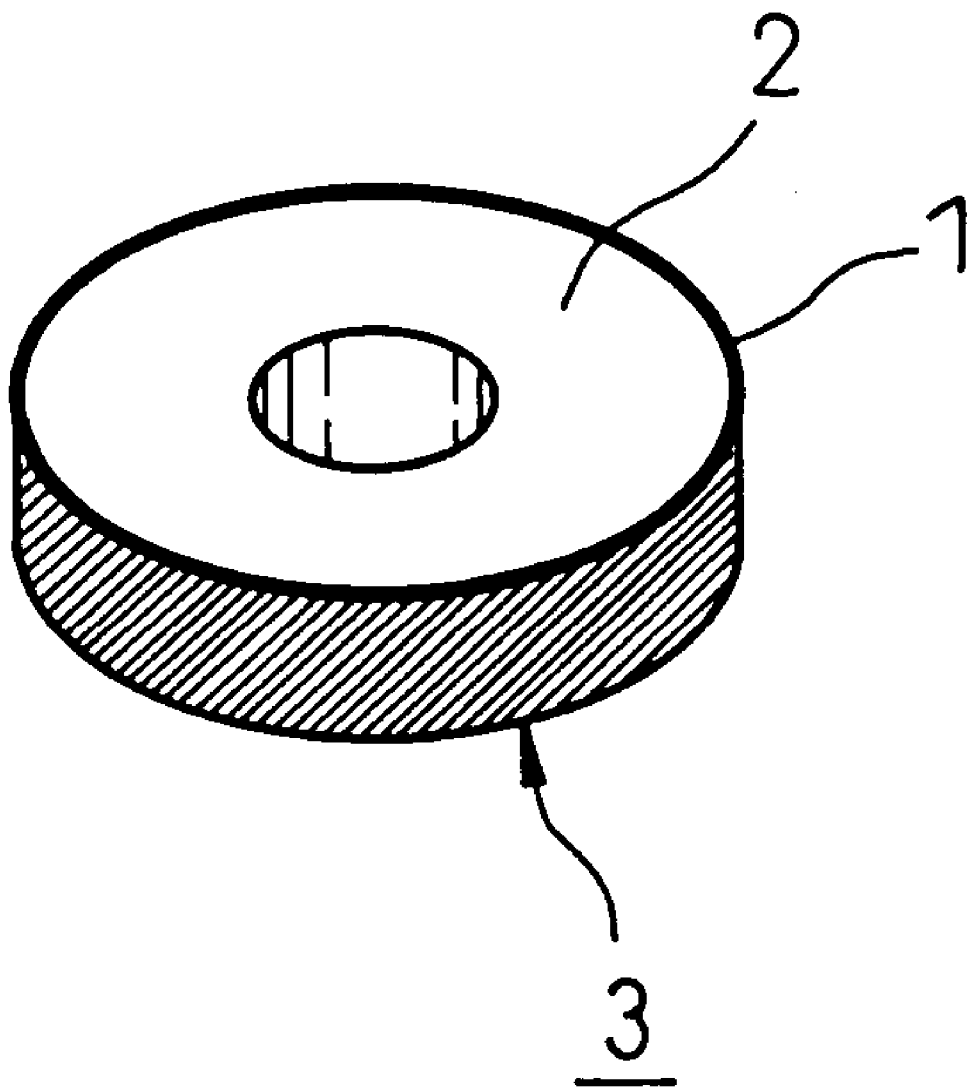
FIG. 1 is a perspective view of a grinder prepared in an example.

In the drawing, 1 denotes an abrasive grain layer, 2 denotes a grinder substrate, and 3 denotes a grinder.

DETAILED DESCRIPTION OF THE INVENTION

Preferred embodiments of the invention will now be explained in detail.

1) The aforementioned process for production of polyimide molded bodies wherein the proportion of aromatic tetracarboxylic acid components of the polyimide resin is 85–97 mole percent of a 3,3,4,4'-biphenyltetracarboxylic acid component and 15–3 mole percent of a 2,3,3',4'-biphenyltetracarboxylic acid component.

2) The aforementioned process for production of polyimide molded bodies wherein the step of isotropic hot compression is carried out by the HIP (heat isostatic pressure) method.

3) The aforementioned process for production of polyimide molded bodies wherein the body molding is followed by heating at 100–350° C. for approximately 30 minutes to 24 hours for stress relaxation treatment.

According to the invention, the polyimide powder used is a polyimide resin powder preferably obtained by polymerization and imidation of 3,3,4,4'-biphenyltetracarboxylic acid, its ester or its dianhydride and 2,3,3',4'-biphenyltetracarboxylic acid, its ester or its dianhydride with p-phenylenediamine and/or m-phenylenediamine [para- and/or meta-, i.e. p-phenylenediamine:m-phenylenediamine (molar ratio)=100:0–0:100, and preferably p-phenylenediamine:m-phenylenediamine (molar ratio)= 98:2–0:100].

The polyimide powder preferably has a structure wherein at least part of and preferably the entire surface of the solid portion composed mainly of an aromatic polyimide with high heat resistance, and preferably a crystalline aromatic polyimide with high heat resistance, preferably with no observed glass transition point (Tg) in the temperature range from room temperature to 400° C., is covered with a thin layer of an amorphous polyimide.

When this polyimide powder is used, it is believed that the polymer softening on the surfaces of the powder particles is sufficient during molding to promote mutual bonding, thus giving a molded body with a high level balance between heat resistance, mechanical strength and elongation.

Furthermore, since the polyimide powder uses biphenyltetracarboxylic acids and phenylenedamine as the essential starting materials, the resulting molded body has low moisture absorption and high chemical resistance.

The above-mentioned aromatic polyimide powder is preferably obtained by polymerization and imidation of an aromatic tetracarboxylic acid component including 3,3,4,4'-biphenyltetracarboxylic acid, its dianhydride or an ester of the acid and a lower alcohol of no greater than 3 carbons, and 2,3,3',4'-biphenyltetracarboxylic acid, its dianhydride or an ester of the acid and a lower alcohol of no greater than 3 carbons (an acid anhydride is preferred in both cases), with the 2,3,3',4'-biphenyltetracarboxylic acid in a proportion of at least about 3 mole percent and no greater than 15 mole percent with respect to the total tetracarboxylic acid component, with p-phenylenediamine and in some cases an additional aromatic tetracarboxylic acid dianhydride and an additional aromatic diamine in a range which produces no adverse effect, in roughly equimolar amounts in an organic polar solvent, by a known method.

The polyimide powder preferably has a mean particle size (primary particles) of about 1–20 $\mu$m in terms of the polymer weight, and more preferably the polyimide powder does not contain particles having a mean particle size of more than 32 $\mu$m. The particles having a mean particle size of more than 32 $\mu$m may be excluded by classification.

According to the process described above, after polymerization and imidation while producing fine particles of the crystalline aromatic polyimide, the amorphous polyimide may be insolubilized to precipitate the polyimide particles, and then the product collected to easily obtain uniform polyimide particles with low residual reaction solvent, as a polyimide powder with a two-layer structure.

In this case, a high proportion of amorphous polyimide produces more aggregates of the polyimide particles, resulting in inferior properties of the obtained molded bodies.

As the aforementioned additional aromatic tetracarboxylic acid there may be mentioned pyromellitic acid or its dianhydride, 3,3',4,4'-benzophenonetetracarboxylic acid or its dianhydride, 2,2'-bis(3,4-dicarboxyphenyl)propane or its dianhydride, bis(3,4-dicarboxyphenyl)methane or its dianhydride and bis(3,4-dicarboxyphenyl)ether or its dianhydride. The additional aromatic tetracarboxylic acid component is preferably present at no greater than 30 mole percent in the aromatic tetracarboxylic acid component.

As the aforementioned additional aromatic diamine there may be mentioned 4,4'-diaminodiphenylether, 4,4'-diaminodiphenylmethane, 4,4'-diaminodiphenylpropane, 1,4-bis(4-aminophenoxy)benzene and 1,3-bis(4-aminophenoxy)benzene. The additional aromatic diamine is preferably present at no greater than 30 mole percent in the aromatic diamine component.

The aromatic polyimide powder is produced, for example, by adding approximately equimolar amounts of the aforementioned aromatic tetracarboxylic acid component and aromatic diamine component to a reaction solvent comprising an amide-based solvent at 15–100 wt % and a non-amide-based solvent with a boiling point of 180° C. or higher at 85–0 wt % and containing 100 ppm to 5 wt % of water, in the presence of an inert gas, preferably for a total monomer content of 2–25 wt % in the solvent, raising the temperature while distilling off the water produced, precipitating fine particles at a temperature in a range from 100° C. to below 180° C. and continuing the reaction for 0.5–20 hours in a temperature range of 160–250° C. to obtain a polyimide powder with an inherent viscosity (30° C., 0.5 g/100 ml concentrated sulfuric acid) of 0.2–1.5 and an imidation rate of 95% or greater.

The non-amide-based solvent and water may be used as a mixed solvent prior to the polyamic acid synthesis, or they may be added to the reaction solution after the polyamic acid synthesis.

Prior to the stage of fine particle precipitation and after adjustment of the reaction solution temperature from 100° C. to below 180° C., an imidation catalyst, preferably an imidazole-based imidation catalyst, may be added to the reaction system and imidation carried out under the heating conditions described above for adjustment of the imidation rate, to modify the particle size and particle size distribution of the produced polyimide powder.

The amide-based solvent used may be N-methyl-2-pyrrolidone, N,N-dimethylacetamide, N,N-dimethylformamide or N-methylcaprolactam, and is preferably N-methyl-2-pyrrolidone.

The method of obtaining the polyimide powder after completion of the imidation reaction is not particularly restricted, and for example, the method adopted may involve filtration of the aromatic polyimide powder from the reaction mixture either directly or after cooling to room temperature, and then washing of the powder with a solvent and drying.

The washing solvent may be any low boiling point solvent capable of replacing the reaction solvent, with water or an alcohol such as methanol, ethanol or isopropanol (IPA), and especially IPA, being particularly preferred.

The drying may be carried out at 250° C. or below, either at ordinary pressure or under reduced pressure. The method adopted is preferably drying under reduced pressure at 200° C. or below. The dried powder is preferably dried to a weight reduction of 1% or lower and especially 0.5% or lower, by heating at 350° C. for at least one hour.

The aromatic polyimide powder need not be pulverized, but it may be pulverized with a Henschel mixer, Willy mill or the like. The small amount of aggregate produced during polymerization may be separated and removed by vibration straining.

According to the invention, a polyimide powder molded body is produced by a step of molding the polyimide resin powder at a pressure of approximately 800 to approximately 5,000 kgf/cm$^2$, a step of calcining the pressed body at about 450–550° C. in the absence of pressure, a step of vacuum encapsulation of the calcined molded body into a metal capsule, and a step of subjecting the encapsulated molded body to hot compression at about 460–550° C. and preferably about 470–550° C., preferably in an argon atmosphere.

For molding of the polyimide resin powder at a pressure of approximately 800 to approximately 5,000 kgf/cm$^2$, the polyimide resin powder is molded into the desired shape with uniaxial pressing or CIP (cold isostatic pressure) molding at from room temperature to 200° C., and preferably room temperature.

According to the invention, the polyimide resin powder body which has been pressed at low temperature is then calcined preferably at a low pressure of 0.5–10 atmospheres and especially under atmospheric pressure, at about 450–550° C. and especially 470–550° C., and under an inert gas stream of preferably nitrogen gas, helium gas or the like.

The step of calcination at about 450–550° C. is preferably accomplished by raising the temperature to about 450° C. or higher at a temperature elevating rate of 0.5–10° C./min. The heating time at the temperature within this range is preferably about 5–30 minutes.

The molded body which has been hot molded under atmospheric pressure is preferably cooled at a cooling rate of 0.5–10° C./min in the calcination furnace to enhance the properties of the molded body.

According to the invention, at least one and preferably a plurality of the calcined molded bodies are vacuum encapsulated in a metal capsule of SUS foil or the like, and the encapsulated molded body is isotropically subjected to pressure in an inert atmosphere of nitrogen, helium, argon or the like, and preferably an argon atmosphere, using a low melting point alloy as the medium, and molding is thus accomplished by hot compression preferably at approximately 500–5,000 kgf/cm$^2$ and especially approximately 500–2,000 kgf/cm$^2$, at about 460–550° C. and preferably about 470–550° C.

The method of isotropic hot compression of the molded body is preferably the HIP method using an HIP (heat isostatic pressure) apparatus.

After molding of a member according to the process of the invention, it is preferably heated at 100–350° C. for about 30 minutes to 24 hours for stress relaxation treatment to avoid dimensional changes in the polyimide molded body.

For production of the powder molded body, a filler of any type, for example, an inorganic filler such as artificial diamond, silica, mica, kaolin, talc, boron nitride, aluminum oxide, iron oxide, graphite, molybdenum sulfide or iron sulfide, or an organic filler such as a fluorine resin, may be mixed with the polyimide powder.

The filler addition may be accomplished by mixing using any internal addition or external addition method.

Polyimide molded bodies obtained by the process of the invention have the excellent heat resistance of conventional publicly known polyimide powder molded bodies obtained by hot compression molding of 3,3',4,'-biphenyltetracarboxylic acids and phenylenediamine without lower rigidity, as well as satisfactory elongation, low moisture absorption, good dimensional stability and high productivity.

The polyimide molded bodies of the invention are preferably made by molding polyimide powder comprising at least 70 mole percent of a 3,3',4,4'-biphenyltetracarboxylic dianhydride component and at least 70 mole percent of a para- or meta-phenylenediamine component by a molding method involving the HIP method, and they exhibit a flexural strength of approximately 85 MPa or greater and especially approximately 90 MPa or greater.

The polyimide molded bodies of the invention can be used as molded bodies for various members in the field of discharge treatment apparatuses which require low out gas and satisfactory heat resistance, chemical resistance and dimensional stability (after high temperature treatment and washing).

The polyimide molded bodies of the invention can also be used as molded bodies in optical fields which require low out gas and satisfactory abrasive properties (heat resistance).

The polyimide molded bodies of the invention may still further be used as inner members of semiconductor manufacturing apparatuses which require plasma resistance, vacuum properties, rigidity, machining workability and heat resistance.

The polyimide molded bodies of the invention may still further have oxygen plasma etching rate of not more than 10 $\mu$m/cm$^2$·hr, more preferably not more than 7 $\mu$m/cm$^2$·hr, especially not more than 6 $\mu$m/cm$^2$·hr, in ultimate vacuum at 300° C.

Examples of the invention will now be provided. The properties of each of the polyimide powder molded bodies discussed in these examples were measured by the following test methods.

Tensile properties: Measured according to ASTM D-638.

Flexural properties: Measured according to ASTM D-790.

Linear expansion coefficient (25–450° C.): Measured according to ASTM E-233.

Thermal deformation temperature: Measured according to ASTM D-648.

Moisture absorption: Measured according to ASTM D-570, as the moisture absorption of the molded body after standing in water at 23° C. for 24 hours.

Linear expansion coefficient anisotropy: Measured as the coefficient of linear thermal expansion (CTE) in the MD direction (direction of thickness of the molded body and the coefficient of linear thermal expansion (CTE) in the TD direction (direction of width of the molded body).

A CTE (MD)/CTE (TD) of 0.95–1.05 was defined as satisfactory linear expansion coefficient isotropy, a value of below 0.9 or above 1.1 was defined as unsatisfactory linear expansion coefficient isotropy, and a value of 0.9–0.95 or 1.05–1.1 was defined as normal linear expansion coefficient isotropy.

Plasma resistance: A plasma generator by Mori Engineering Co., Ltd. was used for plasma irradiation of the molded body in RIE mode and in oxygen gas with an output of 700 W, a pressure of 65 Pa and a temperature of 145° C., and the etching rate of the molded body was periodically measured.

Vacuum gas discharge property: An EMD-WA1000 high precision thermal desorption gas analyzer by Denshi Kagaku Co., Ltd. was used for measurement of the ultimate vacuum at 300° C.

EXAMPLE 1

In a four-necked flask equipped with a thermometer, stirrer, nitrogen inlet tube and aquameter, nitrogen gas was blown through while reacting dried 2,3,3',4'-biphenyltetracarboxylic acid dianhydride (a-BPDA) and 3,3',4,4'-biphenyltetracarboxylic acid dianhydride (s-BPDA) in a molar ratio of a-BPDA/s-BPDA=7/93, using p-phenylenediamine as the diamine and NMP as the polymerization solvent, with a polymer concentration of 17 wt %, a temperature of 195° C. and a time of 4 hours.

The polyimide resin particles dispersed in the N-methyl-2-pyrrolidone (NMP) solution were recovered by filtration, and these were washed 3 times with a 4-fold volume of thermal ionization water and once with a 4-fold volume of IPA, and then dried under reduced pressure at 200° C. to obtain polyimide resin particles with an inherent viscosity (30° C., 0.5 g/100 ml concentrated sulfuric acid) of 1.28 and an imidation rate of at least 95%.

Observation of the obtained polyimide resin particles with a transmission electron microscope revealed a two-layer structure wherein the entire surfaces of the polyimide particles were covered with a coating layer made of amorphous polyimide, no glass transition point was observed up to 400° C., and the mean particle size was 9.3 μm.

The obtained polyimide resin particles were first molded into a 100 mm×100 mm×10 mm (thickness) preform with a uniaxial press at a pressure of approximately 1,000 kgf/cm² (80 MPa) and then the preform was calcined in the absence of pressure at 500° C. for about 15 minutes using an inert oven. An HIP molding apparatus by Kobe Steel Co., Ltd. was then used for hot compression of 200 of the molded bodies at a pressure of 1.8 ton/cm² (HIP pressure: 196 MPa) in an argon atmosphere at 500° C. for 15 minutes for HIP molding, and a polyimide molded body with satisfactory properties was obtained.

The properties of the obtained molded body were as follows.

Polyimide molded body properties:

| | |
|---|---|
| Elongation: | 4.4% |
| Molded body density: | 1.46 g/cm³ |
| Flexural strength: | 135 MPa |
| Flexural modulus: | 7.2 GPa |
| Linear expansion coefficient (MD, 25–450° C.): | 40 ppm/° C. |
| CTE (MD)/CTE (TD): | 1.03 |
| Thermal deformation temperature: | 476° C. |
| Vacuum gas discharge properties (300° C.): | 3.3 × 10⁻⁶ Torr · 1/sec · cm² |
| Oxygen plasma etching rate: | 5.0 μm/cm² · hr |
| Moisture absorption: | 0.07% |

EXAMPLE 2

A molded body was obtained in the same manner as Example 1, except that the pressure during preform molding was 98 MPa, and the temperature during HIP molding was 480° C.

The properties of the obtained molded body were as follows.

Polyimide molded body properties:

| | |
|---|---|
| Elongation: | 3.5% |
| Molded body density: | 1.47 g/cm³ |
| Flexural strength: | 137 MPa |
| Flexural modulus: | 7.3 GPa |
| CTE (MD)/CTE (TD): | 0.98 |
| Thermal deformation temperature: | 473° C. |
| Vacuum gas discharge properties (300° C.): | 3.3 × 10⁻⁶ Torr · 1/sec · cm² |
| Oxygen plasma etching rate: | 4.9 μm/cm² · hr |
| Moisture absorption: | 0.05% |

EXAMPLE 3

A molded body was obtained in the same manner as Example 1, except that the pressure during preform molding was 196 MPa, and the pressure during HIP molding was 176 MPa.

The properties of the obtained molded body were as follows.

Polyimide molded body properties:

| | |
|---|---|
| Elongation: | 4.0% |
| Molded body density: | 1.46 g/cm³ |
| Flexural strength: | 134 MPa |
| Flexural modulus: | 7.1 GPa |
| CTE (MD)/CTE (TD): | 1.01 |
| Thermal deformation temperature: | 478° C. |
| Vacuum gas discharge properties (300° C.): | 3.3 × 10⁻⁶ Torr · 1/sec. · cm² |
| Oxygen plasma etching rate: | 5.1 μm/cm² · hr |
| Moisture absorption: | 0.05% |

EXAMPLE 4

A molded body was obtained in the same manner as Example 1, except that the pressure during preform molding was 392 MPa, and the pressure during HIP molding was 147 MPa.

The properties of the obtained molded body were as follows.

Polyimide molded body properties:

| | |
|---|---|
| Elongation: | 4.7% |
| Molded body density: | 1.45 g/cm$^3$ |
| Flexural strength: | 132 MPa |
| Flexural modulus: | 6.9 GPa |
| CTE (MD)/CTE (TD): | 1.04 |
| Thermal deformation temperature: | 473° C. |
| Vacuum gas discharge properties (300° C.): | 3.3 × 10$^{-6}$ Torr · 1/sec · cm$^2$ |
| Oxygen plasma etching rate: | 4.8 μm/cm$^2$ · hr |
| Moisture absorption: | 0.1% |

EXAMPLE 5

The molded bodies obtained in Examples 1 to 4 were each heated at 250° C. for 12 hours for stress relaxation. The shape homogeneity and dimensional precision of all the bodies were improved.

Comparative Example 1

A molded body was obtained by hot compression molding with a uniaxial press at a molding pressure of 392 MPa and a molding temperature of 500° C.

The obtained molded body had high linear expansion coefficient anisotropy. The properties were as follows.

| | |
|---|---|
| Molded body density: | 1.47 g/cm$^3$ |
| Flexural strength: | 109 MPa |
| Flexural modulus: | 7.4 GPa |
| CTE (MD)/CTE (TD): | 1.29 |
| Oxygen plasma etching rate: | 5.2 μm/cm$^2$ · hr |
| Moisture absorption: | 0.03% |

Comparative Example 2

HIP molding was carried out in the same manner as Example 1 except that the pressure during preform molding was 196 MPa, and the preform obtained without heating was subjected to HIP molding.

Cracking occurred during the molding.

Comparative Example 3

A molded body was obtained in the same manner as Example 1, except that the pressure during preform molding was 196 MPa, and the temperature during HIP molding was 400° C.

The properties of the obtained molded body were as follows.

Polyimide molded body properties:

| | |
|---|---|
| Molded body density: | 1.35 g/cm$^3$ |
| Flexural strength: | 110 MPa |
| Flexural modulus: | 4.7 GPa |
| CTE (MD)/CTE (TD): | 1.10 |
| Moisture absorption: | 1.7% |

EXAMPLE 6

25% by weight of a synthetic diamond powder of 200 mesh was dry blended with 75% by weight of the polyimide fine particles as prepared and used in Example 1. The blend of the polyimide fine particles and the synthetic diamond powder was filled in a cavity of a die in which a stainless steel grinder substrate had been placed and single-screw press molded under a pressure of 98 MPa. The molded body was then calcined at 500° C. and HIP molded according to the procedure as in Example 1 to obtain a grinder in which an abrasive grain layer of the polyimide molded body containing the synthetic diamond fine particles was firmly assembled to the stainless steel substrate.

The present invention having the construction described in detail above exhibits the following effects.

The process for production of polyimide molded bodies according to the invention allows simultaneous calcination of a plurality of molded bodies. High productivity is thereby achieved.

Furthermore, the molded bodies obtained by the present invention have satisfactory heat resistance and strength, low linear expansion coefficients, satisfactory linear expansion coefficient isotropy, and low moisture absorption.

What is claimed is:

1. A process for production of polyimide molded bodies which comprises a step in which a polyimide resin powder obtained by polymerization and imidation of p-phenylenediamine with 3,3,4,4'-biphenyltetracarboxylic acid, its ester or its dianhydride and 2,3,3',4'-biphenyltetracarboxylic acid, its ester or its dianhydride is molded at a pressure of approximately 800–5,000 kgf/cm$^2$, a step in which the pressurized body is subjected to calcination at about 450–550° C. under low pressure, a step in which the calcined molded body is vacuum encapsulated into a metal capsule, and a step in which the encapsulated molded body is isotropically subjected to hot compression at approximately 460–550° C. in an inert gas atmosphere such as argon.

2. The process of claim 1, wherein the proportion of aromatic tetracarboxylic acid components of the polyimide resin is 85–97 mole percent of a 3,3,4,4'-biphenyltetracarboxylic acid component and 15–3 mole percent of a 2,3,3',4'-biphenyltetracarboxylic acid component.

3. A polyimide molded body produced by the process of claim 2, wherein the density of the molded body is in the range of 1.44–1.48 g/cm$^3$.

4. The process of claim 1, wherein the step of isotropic hot compression is carried out by the HIP (heat isostatic pressure) method.

5. A polyimide molded body produced by the process of claim 4, wherein the density of the molded body is in the range of 1.44–1.48 g/cm$^3$.

6. The process of claim 1, wherein the body molding is followed by heating at 100–350° C. for approximately 30 minutes to 24 hours for stress relaxation treatment.

7. A polyimide molded body produced by the process of claim 6, wherein the density of the molded body is in the range of 1.44–1.48 g/cm$^3$.

8. A polyimide molded body produced by the process of claim 1, wherein the density of the molded body is in the range of 1.44–1.48 g/cm$^3$.

* * * * *